US010766455B2

(12) United States Patent
Uenoyama et al.

(10) Patent No.: US 10,766,455 B2
(45) Date of Patent: Sep. 8, 2020

(54) SOUND OUTPUT APPARATUS, SOUND OUTPUT CONTROL METHOD, VEHICLE, AND LOCKING AND UNLOCKING SYSTEM

(71) Applicant: TOYOTA JIDOSHA KABUSHIKI KAISHA, Toyota-shi (JP)

(72) Inventors: Naoki Uenoyama, Nisshin (JP); Etsuko Nakajima, Nagoya (JP); Junya Masui, Nagoya (JP); Akira Hoshino, Nagoya (JP); Hideo Hasegawa, Nagoya (JP); Keiko Nakano, Kawasaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 46 days.

(21) Appl. No.: 16/164,932

(22) Filed: Oct. 19, 2018

(65) Prior Publication Data
US 2019/0184936 A1 Jun. 20, 2019

(30) Foreign Application Priority Data
Dec. 14, 2017 (JP) ................................ 2017-239677

(51) Int. Cl.
*B60R 25/24* (2013.01)
*B60R 25/10* (2013.01)
*G07C 9/00* (2020.01)
*E05B 17/00* (2006.01)
*B60R 25/20* (2013.01)
*E05B 77/44* (2014.01)
*E05B 47/00* (2006.01)

(52) U.S. Cl.
CPC .......... *B60R 25/1003* (2013.01); *B60R 25/20* (2013.01); *B60R 25/24* (2013.01); *B60R 25/241* (2013.01); *E05B 17/0083* (2013.01); *G07C 9/00* (2013.01); *G07C 9/00309* (2013.01); *E05B 77/44* (2013.01); *E05B 2047/0095* (2013.01)

(58) Field of Classification Search
CPC ............................. B60R 25/1003; B60R 25/24
USPC ....................................................... 340/425.5
See application file for complete search history.

(56) References Cited

U.S. PATENT DOCUMENTS 4,987,402 A 1/1991 Nykerk
5,225,825 A 7/1993 Warren
(Continued)

FOREIGN PATENT DOCUMENTS

CH 699 103 A2 1/2010
JP 2006-206225 8/2006
(Continued)

OTHER PUBLICATIONS

Office Action issued to U.S. Appl. No. 16/789,952 dated May 22, 2020.

*Primary Examiner* — Kam Wan Ma
(74) *Attorney, Agent, or Firm* — Oblon, McClelland, Maier & Neustadt, L.L.P.

(57) ABSTRACT

A sound output apparatus and a sound output control method including a sound output controller placed in a vehicle having a door lockable and unlockable based on the result of communicated with mobile terminals are disclosed. The vehicle mounted with the sound output controller and a locking and unlocking system including the vehicle are also disclosed. The sound output controller outputs a sound that is different between when the door is unlocked by a specified mobile terminal and when the door is unlocked by other means.

14 Claims, 6 Drawing Sheets

(56) References Cited

U.S. PATENT DOCUMENTS

| | | |
|---|---|---|
| 7,564,342 B2 | 7/2009 | Klein |
| 7,945,032 B2 | 5/2011 | Elberbaum |
| 9,761,070 B2* | 9/2017 | Juzswik ................ B60R 25/24 |
| 9,821,768 B2 | 11/2017 | Oz et al. |
| 10,002,524 B2 | 6/2018 | Shim et al. |
| 10,237,690 B2 | 3/2019 | Thakur et al. |
| 2003/0222759 A1* | 12/2003 | Amagasa ................ E05B 81/78 |
| | | 340/5.72 |
| 2005/0110619 A1 | 5/2005 | Klein |
| 2005/0258973 A1 | 11/2005 | Black et al. |
| 2009/0146817 A1 | 6/2009 | Ikeda |
| 2009/0190735 A1* | 7/2009 | Gilmartin ........... B60R 16/0373 |
| | | 379/201.12 |
| 2010/0223968 A1* | 9/2010 | Krueger .................. E05B 5/00 |
| | | 70/283.1 |
| 2011/0153118 A1* | 6/2011 | Lim .................. H04M 1/72533 |
| | | 701/2 |
| 2012/0253607 A1* | 10/2012 | Choi ..................... B60R 25/25 |
| | | 701/49 |
| 2013/0208077 A1 | 8/2013 | Cho |
| 2014/0167929 A1 | 6/2014 | Shim et al. |
| 2014/0301565 A1* | 10/2014 | Dorland ................ B60R 25/20 |
| | | 381/86 |
| 2015/0127191 A1* | 5/2015 | Misra ................... G08G 1/0112 |
| | | 701/1 |
| 2015/0149190 A1 | 5/2015 | Chace et al. |
| 2016/0019775 A1 | 1/2016 | Fokkelman |
| 2016/0099927 A1* | 4/2016 | Oz ......................... H04L 63/08 |
| | | 726/9 |
| 2016/0159369 A1* | 6/2016 | Park ..................... B60K 28/12 |
| | | 701/65 |
| 2016/0272153 A1* | 9/2016 | Ogura .................... B60R 25/24 |
| 2016/0342944 A1* | 11/2016 | Wiechers ........... G06Q 10/0836 |
| 2017/0113652 A1* | 4/2017 | Tokudome .......... B60R 25/2036 |
| 2018/0293981 A1 | 10/2018 | Ni et al. |
| 2019/0184936 A1 | 6/2019 | Uenoyama et al. |

FOREIGN PATENT DOCUMENTS

| | | |
|---|---|---|
| JP | 4635390 B2 | 2/2011 |
| KR | 10-1289711 B1 | 7/2013 |
| KR | 10-1369777 B1 | 3/2014 |
| KR | 10-2016-0070203 A | 6/2016 |
| WO | WO 2013/044353 A1 | 4/2013 |
| WO | WO 2017/019760 A1 | 2/2017 |

* cited by examiner

FIG. 3A

SOUND DEFINITION DATA

| DEVICE USED FOR UNLOCKING | OUTPUT SOUND |
|---|---|
| ELECTRONIC KEY | SOUND 1 |
| MOBILE TERMINAL POSSESSED BY VEHICLE OWNER | SOUND 1 |
| OTHER MOBILE TERMINALS | SOUND 2 |
| ... | ... |

FIG. 3B

SOUND DEFINITION DATA

| DEVICE USED FOR UNLOCKING | TYPE OF MOBILE TERMINAL | OUTPUT SOUND |
|---|---|---|
| ELECTRONIC KEY | - | SOUND 1 |
| MOBILE TERMINAL POSSESSED BY VEHICLE OWNER | - | SOUND 1 |
| OTHER MOBILE TERMINALS | TYPE A | SOUND 2 |
| OTHER MOBILE TERMINALS | TYPE B | SOUND 3 |
| OTHER MOBILE TERMINALS | TYPE C | SOUND 4 |
| ... | ... | ... |

FIG. 4

SOUND DATA

| ID | DATA | DESCRIPTION |
|---|---|---|
| SOUND 1 | (BINARY) | ELECTRONIC SOUND (BEEP) |
| SOUND 2 | (BINARY) | SPEECH ("AUTHENTICATION IS NORMALLY COMPLETED") |
| SOUND 3 | GENERATED BY SYNTHESIS | SYNTHETIC SPEECH ("AUTHENTICATION IS NORMALLY COMPLETED") |
| SOUND 4 | (BINARY) | NOTIFICATION MELODY |
| ... | ... | ... |

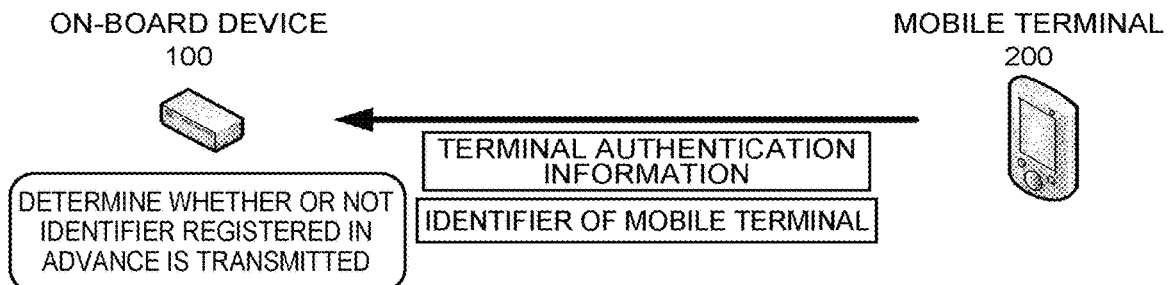
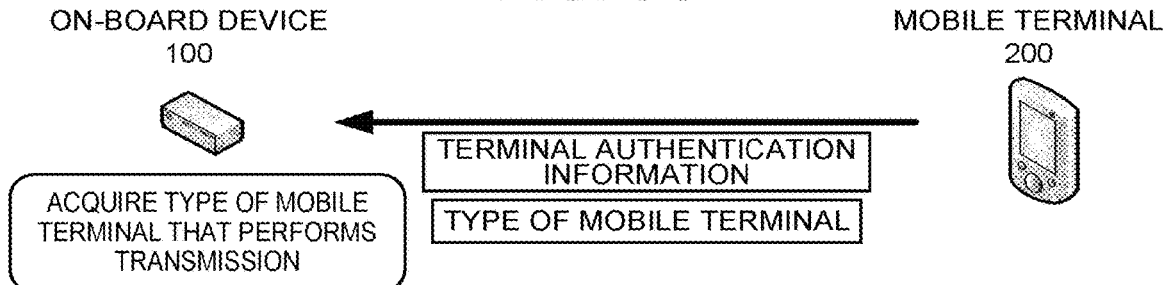
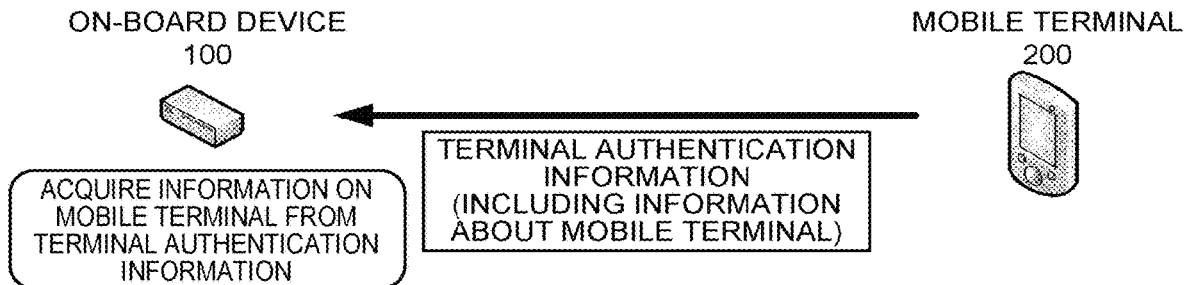

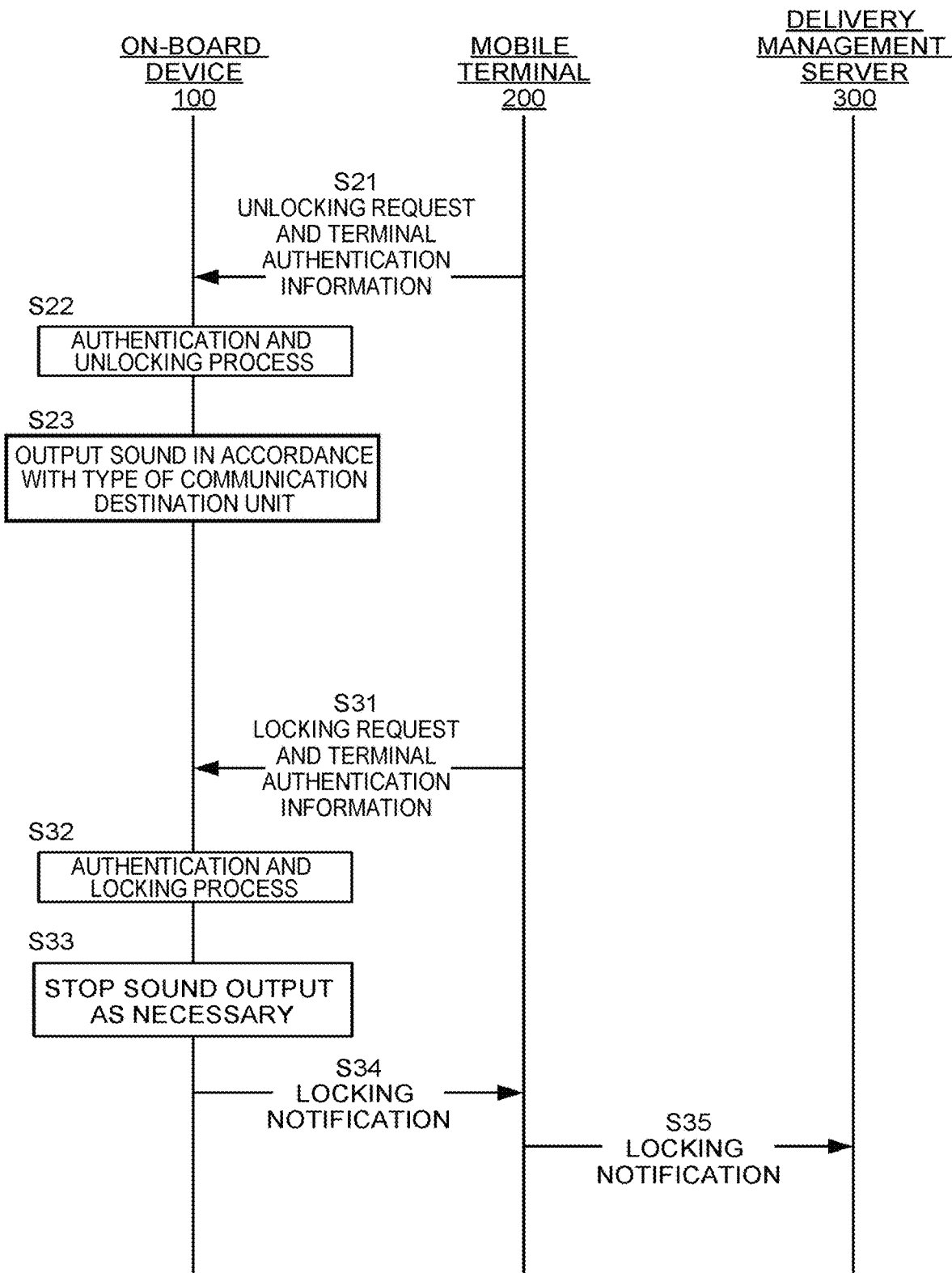

SOUND OUTPUT APPARATUS, SOUND OUTPUT CONTROL METHOD, VEHICLE, AND LOCKING AND UNLOCKING SYSTEM

INCORPORATION BY REFERENCE

The disclosure of Japanese Patent Application No. 2017-239677 filed on Dec. 14, 2017 including the specification, drawings and abstract is incorporated herein by reference in its entirety.

BACKGROUND

1. Technical Field

The present disclosure relates to a sound output apparatus, a sound output control method, a vehicle, and a locking and unlocking system.

2. Description of Related Art

There is disclosed a technique of delivering a delivery object in a trunk of a loading vehicle that is specified by a receiver as a delivery destination (see, for example, Japanese Patent Application Publication No. 2006-206225). According to the technique, when the receiver specifies one's own vehicle as a delivery destination, the receiver can receive the delivery object, even while the receiver is absent, without the necessity of installing a system such as a home-delivery locker.

SUMMARY

In the above system, a person, who does not look like the owner of a vehicle at a single glance, such as a person in charge of delivery, opens and closes the door of the vehicle, and enters a vehicle cabin of the vehicle. Accordingly, when a person who does not know the system that uses a vehicle to receive a delivery object witnesses the delivery process, it is difficult for the person to distinguish the delivery process from a vehicle theft.

The present disclosure provides a technique in a system that can unlock a vehicle with a mobile terminal, the technique relating to notifying surrounding people that the vehicle is unlocked by authorized means.

A sound output apparatus according to the present disclosure is a sound output apparatus placed in a vehicle having a door lockable and unlockable based on a result of communication with mobile terminals. The sound output apparatus includes a sound output controller. The sound output controller is configured to output a sound from the speaker, when the door of the vehicle is unlocked based on authentication information received from the mobile terminals for unlocking of the door. The sound output controller is configured to output different sounds between when the door is unlocked by a specified mobile terminal and when the door is unlocked by other means. The specified mobile terminal is one of the mobile terminals.

A sound output apparatus according to the present disclosure is placed in a vehicle having a door lockable and unlockable based on a result of communicating with mobile terminals to acquire authentication information and collating the authentication information. The authentication information may be acquired, for example, through short-distance wireless communication.

The sound output controller outputs a sound from the speaker, when the door is unlocked. General vehicles have an answerback function with a sound effect and the like when the door is unlocked. In the present disclosure, the sound output controller outputs different sounds between when the door is unlocked by a specified mobile terminal and when the door is unlocked by other means. The specified mobile terminal is a mobile terminal temporarily provided with an unlocking authority by the owner of the vehicle, for example. Such configuration can notify surrounding people that an authorized person is unlocking the vehicle.

The specified mobile terminal may be a mobile terminal that transmitted the authentication information provided with a validity term.

The authentication information provided with a validity term signifies that the pertinent mobile terminal is temporarily provided with the unlocking authority. Outputting a sound unique to such a mobile terminal makes it possible to distinguish between the person having permanent unlocking authority and others.

The sound output controller may be configured to store types of the mobile terminals in association with the sounds to be output. The sound output controller may output the sounds corresponding to the mobile terminals that transmitted the authentication information.

Thus, the sound to be output may be changed based on the type of the mobile terminal, for example, based on whether or not the mobile terminal is a possession of the owner of the vehicle. Such aspect makes it possible to output the sound different for each unlocking purpose and for each delivery company.

The sound output when the door is unlocked by the specified mobile terminal may include a sound announcing that the door is unlocked by authorized means.

Such configuration can clearly notify surrounding people that an authorized person is unlocking the vehicle.

The sound may include a loop sound that continuously sounds while the door is open.

More effective notification may be achieved by loop playback of sound while the door is open as well as while the door is unlocked.

A sound output control method according to the present disclosure is executed by an sound output controller placed in a vehicle having a door lockable and unlockable based on a result of communication with mobile terminals. The sound output control method includes outputting a sound from a speaker when the door of the vehicle is unlocked based on authentication information received from the mobile terminals for unlocking of the door. The sound output when the door is unlocked by a specified mobile terminal is different from the sound when the door is unlocked by other means. The specified mobile terminal is one of the mobile terminals.

In the system that can unlock a vehicle with a mobile terminal, the sound output control method makes it possible to notify surrounding people that the vehicle is unlocked by authorized means.

A vehicle according to the present disclosure is a vehicle communicable with mobile terminals. The vehicle includes a door, first communication device, unlocking devices, and a sound output controller. The first communication device is configured to receive from the mobile terminals authentication information for unlocking the door. The unlocking device is configured to unlock the door based on the authentication information. The sound output controller is configured to output a sound, when the door is unlocked. The sound output controller is configured to output different sounds between when the door is unlocked by a specified mobile terminal and when the door is unlocked by other means. The specified mobile terminal is one of the mobile terminals.

In the system that can unlock a vehicle with a mobile terminal, the vehicle can notify surrounding people that the vehicle is unlocked by authorized means.

A locking and unlocking system according to the present disclosure includes mobile terminals, a vehicle, and a server apparatus. The mobile terminals each include a short-distance communication unit configured to transmit first authentication information through short-distance wireless communication. The vehicle includes a door, first communication device, unlocking devices, and a sound output controller. The first communication device is configured to receive the first authentication information from the mobile terminals. The first authentication information is information for unlocking the door. The unlocking device is configured to unlock the door based on the result of collating the first authentication information and second authentication information. The second authentication information is information corresponding to the first authentication information. The sound output controller is configured to output a sound when the door is unlocked. The sound output controller is configured to store the second authentication information. The sound output controller is configured to output different sounds between when the door is unlocked by a specified mobile terminal and when the door is unlocked by other means. The specified mobile terminal is one of the mobile terminals. The server apparatus includes second communication device. The second communication device is configured to transmit the first authentication information to the mobile terminal and transmit the second authentication information to the vehicle.

According to the present disclosure, in the system that can unlock a vehicle with a mobile terminal, it is possible to notify surrounding people that the vehicle is unlocked by authorized means.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A illustrates an example of sound definition data stored in an on-board device 100;

FIG. 3B illustrates an example of sound definition data stored in an on-board device 100;

FIG. 4 illustrates an example of the sound data stored in the on-board device 100;

FIG. 5A illustrates an example of data transmitted to the on-board device 100 from a mobile terminal 200;

FIG. 5B illustrates an example of data transmitted to the on-board device 100 from a mobile terminal 200;

FIG. 5C illustrates an example of data transmitted to the on-board device 100 from a mobile terminal 200;

FIG. 5D illustrates an example of data transmitted to the on-board device 100 from a mobile terminal 200;

FIG. 7 is an explanatory view illustrating a data flow in the first embodiment.

DETAILED DESCRIPTION OF EMBODIMENTS

Figure 1:
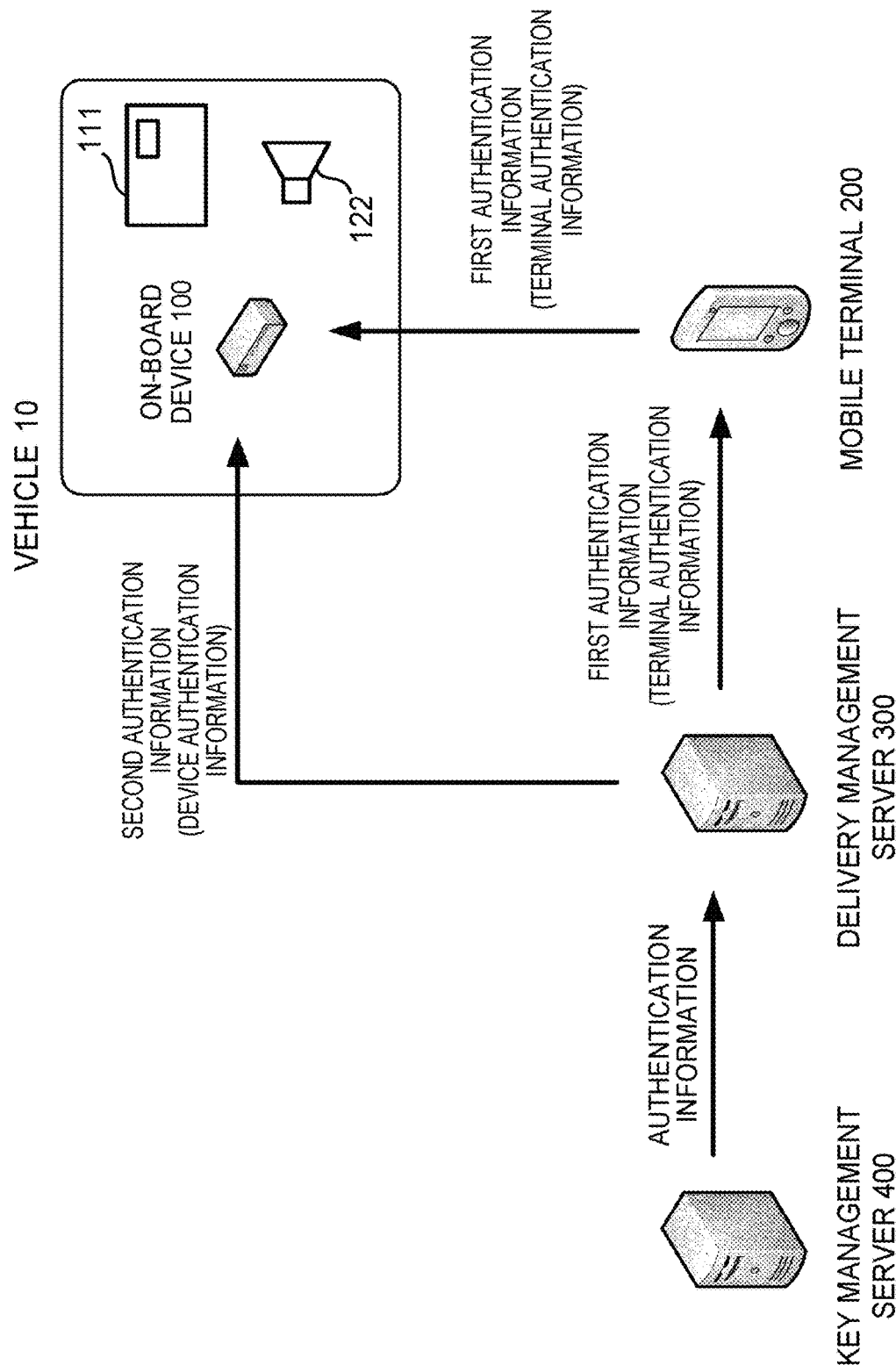
FIG. 1 is a system configuration chart of a delivery system according to a first embodiment.

The outline of a delivery system according to the first embodiment will be described with reference to FIG. 1. The delivery system according to the present embodiment is configured by including an on-board device 100, a mobile terminal 200, a delivery management server 300, and a key management server 400. In the delivery system according to the first embodiment, the on-board device 100 mounted on a vehicle 10 performs wireless communication with a mobile terminal 200 outside the vehicle, and locks and unlocks the vehicle 10 based on the result of the communication. More specifically, a user of the system can locks and unlocks the vehicle 10 only with the mobile terminal 200, without using a physical key.

The key management server 400 is a server apparatus that issues information (authentication information) used by the on-board device 100 to authenticate the mobile terminal 200. The key management server 400 issues first authentication information to the mobile terminal 200 through the delivery management server 300, and similarly issues second authentication information to the on-board device 100 through the delivery management server 300. The on-board device 100 collates the authentication information to authenticate that the mobile terminal 200 is an authorized terminal. Such an authorized terminal is an example of "authorized means".

The delivery management server 300 is a server apparatus that manages a plurality of mobile terminals 200 possessed by persons in charge of delivery. Although one mobile terminal 200 and one vehicle 10 are illustrated in FIG. 1, the delivery management server 300 may manage multiple mobile terminals 200. The mobile terminal 200 may access multiple vehicles 10.

Figure 2:
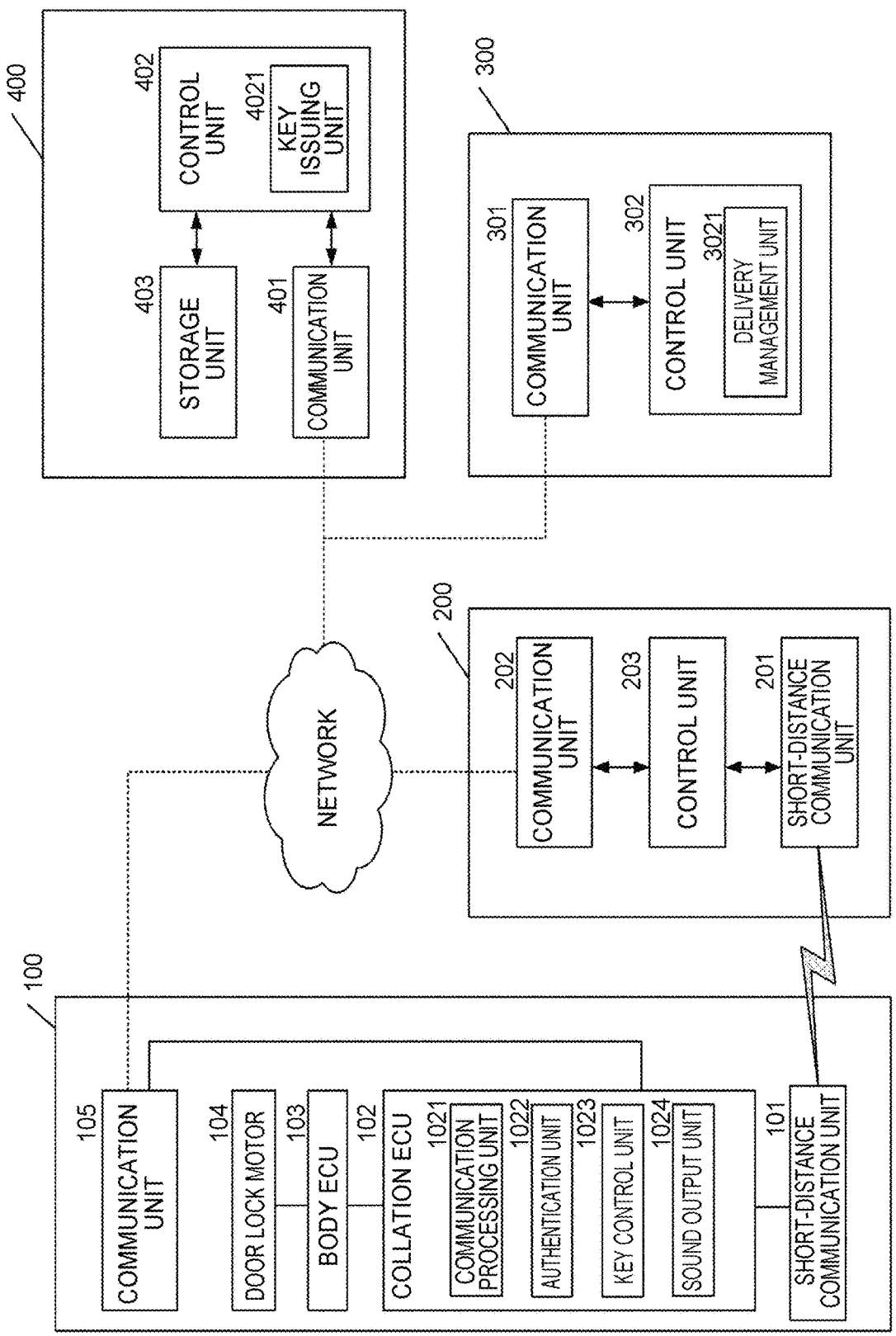
FIG. 2 is a block diagram illustrating component members included in the delivery system according to the first embodiment.

The component members of the system will be described in detail. FIG. 2 is a block diagram schematically illustrating one example of the configuration of the on-board device 100, the mobile terminal 200, the delivery management server 300, and the key management server 400 illustrated in FIG. 1. Among the component members, the on-board device 100 is mounted on the vehicle 10 that is a target of locking and unlocking.

The on-board device 100 is a device for locking and unlocking a door 111 of the vehicle. The on-board device 100 locks and unlocks the door 111 of the vehicle 10 in response to a locking signal and an unlocking signal transmitted from an electronic key (mobile device) possessed by a user of the vehicle through an electric wave in radio frequency bands. In the present embodiment, the on-board device 100 has, in addition to the above-stated function, the function of locking and unlocking the door 111 based on the result of communication with the mobile terminal 200.

The on-board device 100 is configured by including a short-distance communication unit 101, a collation ECU 102, a body ECU 103, a door lock motor 104, and a communication unit 105. The on-board device 100 operates with the electric power supplied from an unillustrated auxiliary battery mounted on the vehicle 10. In the present example, illustration of the means for communicating with the electronic key is omitted.

The short-distance communication unit 101 is a module that communicates with the mobile terminal 200 possessed by the user. The short-distance communication unit 101 performs communication in a short distance in conformity to specified wireless communication standards. The short distance is a distance short enough to allow communication between the inside and the outside of a vehicle cabin.

In the present embodiment, the short-distance communication unit 101 performs data communication in conformity to Bluetooth (registered trademark) low energy standards (hereinafter referred to as BLE). The BLE standards are low electric power telecommunications standards by Bluetooth, characterized by quick start of communication upon detection of a communication counterpart without the necessity of pairing of devices. Although BLE is presented in the present embodiment, other wireless communication standards are also available. For example, wireless communication standards, such as a near field communication (NFC), an ultra-wide band (UWB), and WiFi (registered trademark), can also be used.

The collation ECU 102 performs short-distance wireless communication with the mobile terminal 200 through the short-distance communication unit 101 to control authentication of the mobile terminal 200. The collation ECU 102 performs control to lock and unlock the door 111 of the vehicle 10 based on the result of authentication. The collation ECU 102 is composed of a microcomputer, for example.

The collation ECU 102 has a communication processing unit 1021, an authentication unit 1022, a key control unit 1023, and a sound output unit 1024 as functional modules. The functional modules may each be implemented when a central processing unit (CPU) (not illustrated) executes programs stored in storage means, such as a read only memory (ROM) (not illustrated).

The communication processing unit 1021 processes communication with the mobile terminal 200 performed through the short-distance communication unit 101. The communication processing unit 1021 receives a locking request or an unlocking request from the mobile terminal 200, and generates locking and unlocking signals in response to the received requests. The locking request and the unlocking request are collectively referred to as locking and unlocking requests. The generated locking and unlocking signals are temporarily stored, and are output at the timing when the later-described authentication unit 1022 succeeds in authentication of the mobile terminal 200.

The authentication unit 1022 authenticates the mobile terminal 200 based on authentication information included in the locking and unlocking requests transmitted from the mobile terminal 200. The authentication unit 1022 collates the authentication information stored in the authentication unit 1022 with the authentication information transmitted from the mobile terminal 200. When the authentication information coincide with each other, the authentication unit 1022 determines the authentication successful. When the authentication information do not coincide with each other, the authentication unit 1022 determines the authentication unsuccessful. When the authentication unit 1022 succeeds in authentication of the mobile terminal 200, locking and unlocking signals generated by the communication processing unit 1021 are transmitted to the later-described key control unit 1023. An authentication method performed by the authentication unit 1022 may be a method that simply collates authentication information with each other to verify identity, or may be a method using an asymmetric cipher. The term "coincide" may indicate that two pieces of authentication information can be confirmed to correspond to each other, and may not indicate that both the authentication information are identical. Hereinafter, the authentication information stored in the on-board device 100 is referred to as device authentication information, and the authentication information transmitted from the mobile terminal 200 is referred to as terminal authentication information as needed in description. When it is not necessary to distinguish the information from each other, the information are simply referred to as authentication information. The device authentication information is generated in the later-described key management server 400, and is received and stored in the on-board device 100 through a network.

The key control unit 1023 transmits an unlocking command or a locking command to the later-described body ECU 103 based on the result of authentication performed by the authentication unit 1022. The signal of the unlocking command or the locking command is transmitted through an in-vehicle network, such as a controller area network (CAN).

When the vehicle 10 is unlocked, the sound output unit 1024 identifies the device (the mobile terminal 200 or the electronic key) used for unlocking, and outputs a sound corresponding to the pertinent device through the sound output device, such as a speaker 122. A specific method will be described later. Voice output in the present specification includes operation to play back a recorded sound as well as operation to output a sound (for example, synthetic sound) generated by the device and a sound (for example, a buzzer sound) generated from the device.

The body ECU 103 is a computer that performs control of a vehicle body. The body ECU 103 controls the later-described door lock motor 104 based on a received unlocking command or a locking command so as to perform unlocking and locking of the door 111 of the vehicle. The body ECU 103 may further have functions to control components relating to the vehicle body, such as power window control, seat adjustment, theft prevention, seat belt control, and headlight control.

The door lock motor 104 is an actuator that locks and unlocks the door 111 of the vehicle 10. The door 111 includes a trunk besides an entrance door and a rear gate. The door lock motor 104 operates based on a signal transmitted from the body ECU 103.

The communication unit 105 is a communication interface for connecting the on-board device 100 to a network. In the present embodiment, the communication unit 105 can communicate with other devices through the network using mobile communications service, such as 3G and LTE.

A description is now given of the mobile terminal 200. The mobile terminal 200 is a small-size computer, such as a smartphone, a cellular phone, a tablet computer, a personal information terminal, a notebook computer, and a wearable computer (such as a smartwatch). The mobile terminal 200 includes a short-distance communication unit 201, a communication unit 202, and a control unit 203.

The short-distance communication unit 201 is means for communicating with the on-board device 100 in conformity to the telecommunications standards identical to those of the short-distance communication unit 101. The communication unit 202 is a communication interface for network connection similar to that of the communication unit 105.

The control unit 203 manages control of the mobile terminal 200. The control unit 203 performs following processes, for example. The processes include a process of generating locking and unlocking requests, a process of acquiring the terminal authentication information, and a process of transmitting the locking and unlocking requests and the terminal authentication information to the on-board device 100. The control unit 203 is composed of a microcomputer, for example. The control unit 203 may implement the functions by causing the CPU (not illustrated) to execute the programs stored in storage means (such as a ROM) (not illustrated).

The control unit 203 is connected with an input output unit (not illustrated) that interacts with a user. The input output unit is composed of, for example, a touch panel, control means for the touch panel, a liquid crystal display, and control means for the liquid crystal display, for example. The touch panel and the liquid crystal display are formed from one touch panel display in the present embodiment.

The control unit 203 displays an operation screen through the input output unit, and generates an unlocking request or a locking request based on operation performed by the user. For example, the control unit 203 outputs an icon, such as an icon for unlocking and an icon for locking to the touch panel display, and generates an unlocking request or a locking request based on the operation performed by the user. The operation performed by the user is not limited to the operation performed through the touch panel display. For example, the operation may be operation performed with a hardware switch and the like.

The control unit 203 performs a process for acquiring terminal authentication information. In the present embodiment, the terminal authentication information is generated in the later-described key management server 400, and is transmitted to the mobile terminal 200 through the later-described delivery management server 300. When the mobile terminal 200 does not have terminal authentication information, the locking operation and unlocking operation through the operation screen are not available.

The terminal authentication information acquired by the mobile terminal 200 may be an invariable key, or may be a onetime key. In any case, the device authentication information corresponding to the terminal authentication information is prestored in the on-board device 100.

A description is now given of the delivery management server 300. The delivery management server 300 is a server apparatus that manages packages to be delivered and the mobile terminals 200 possessed by a plurality of persons in charge of delivery. The delivery management server 300 stores delivery information including distribution places of target packages. When the vehicle 10 is specified as a distribution place, the delivery management server 300 acquires terminal authentication information for performing locking and unlocking of the vehicle 10 that stores a target package from the key management server 400, and transfers the acquired terminal authentication information to the mobile terminal 200. The delivery management server 300 also acquires device authentication information corresponding to the vehicle 10 (on-board device 100) from the key management server 400, and transfers the acquired device authentication information to the on-board device 100. This process is performed by using a request from the mobile terminal 200 possessed by the person in charge of delivery as a starting point. The delivery management server 300 includes a communication unit 301 and a control unit 302.

The communication unit 301 is a communication interface for network connection similar to that of the communication unit 105. The control unit 302 is means for managing control of the delivery management server 300. The control unit 302 is composed of a CPU, for example. The control unit 302 has a delivery management unit 3021 as a functional module. The functional module may be implemented when the CPU (not illustrated) executes a program stored in storage means, such as a ROM (not illustrated).

The delivery management unit 3021 stores and manages the information about a user to be a consignee, the vehicle 10 under management of the user and used as the address for delivery, a package associated with the user, and the like. When the information about a package is received from the mobile terminal 200, the delivery management unit 3021 identifies the vehicle 10 used as the address for delivery, and requests the key management server 400 to issue the terminal authentication information and the device authentication information for locking and unlocking the vehicle 10. The delivery management unit 3021 also transfers the terminal authentication information issued by the key management server 400 to the mobile terminal 200, and transfers the device authentication information to the on-board device 100.

A description is now given of the key management server 400. In response to a request from the delivery management server 300, the key management server 400 issues terminal authentication information used by the mobile terminal 200 and device authentication information used by the on-board device 100. The key management server 400 includes a communication unit 401, a control unit 402, and a storage unit 403.

The communication unit 401 is a communication interface for network connection similar to that of the communication unit 301.

The control unit 402 manages control of the key management server 400. The control unit 402 is composed of a CPU, for example. The control unit 402 has a key issuing unit 4021 as a functional module. The functional module may be implemented when the CPU (not illustrated) executes programs stored in storage means, such as a ROM (not illustrated).

The key issuing unit 4021 issues terminal authentication information and device authentication information in response to a request from the delivery management server 300. As described before, the terminal authentication information is authentication information used by the mobile terminal 200 to lock and unlock the vehicle 10 through the on-board device 100. The device authentication information is authentication information which makes a pair with the terminal authentication information.

The terminal authentication information and the device authentication information may be acquired as prestored information, or may dynamically be generated. It is possible to generate, for example, authentication information valid only in a specified time period, authentication information having a specified use count, authentication information usable only in the specified mobile terminal 200, and the like. When the vehicle 10 has a plurality of independently lockable and unlockable regions, such as a vehicle cabin and a trunk, authentication information that enables any one of the regions to be locked and unlocked may be generated.

The storage unit 403 is a device that stores information. The storage unit 403 is composed of a storage medium, such as a RAM, a magnetic disk, and a flash memory. The storage unit 403 stores device authentication information corresponding to the on-board device 100, terminal authentication information which makes a pair with the device authentication information, and various kinds of data for generating these pieces of authentication information.

A description is now given of the information retained by the sound output unit 1024. The sound output unit 1024 is configured such that a plurality of sounds output at the time of unlocking can be stored in advance, or a plurality of sounds can be generated. The sound output unit 1024 stores information (hereinafter referred to as sound definition data) that associates a device used for unlocking and a sound output at the time of unlocking as illustrated in FIG. 3A. The example in FIG. 3A defines that a sound 1 is output when the vehicle 10 is unlocked with an electronic key or a mobile terminal possessed by the vehicle owner, and a sound 2 is output when the vehicle 10 is unlocked with "other mobile terminals." The term "other mobile terminals" refers to terminals other than the mobile terminal possessed by the vehicle owner. The other terminals include, for example, a mobile terminal possessed by a person in charge of delivery. While the sound definition data may be stored in the sound output unit 1024 in advance (for example, at the time of factory shipments), the data may be updatable by user's operation. The key management server 400 may be configured to concurrently distribute the terminal authentication information and the sound definition data to the on-board device 100.

The sound output unit 1024 also stores sound data as illustrated in FIG. 4. In the case of this example, a sound 1 is defined as an electronic sound for answerback, for example. A sound 2 is defined as a sound for notifying surrounding people that the vehicle is unlocked with an authenticated mobile terminal. The sounds may not be recorded sounds. The sounds may be generated by synthesis like a sound 3. A sound such as a melody may also be allocated as in the case of a sound 4.

Such notification sounds may be melodies and sound effects, or may be human voices. It is possible to more clearly notify the people around the vehicle that the vehicle was unlocked by the operation of an authorized person by outputting a speech such as "authentication is normally completed" or "you can open the door."

A description is now given of a method performed by the sound output unit 1024 to identify the sound to output. Whether the device used for unlocking is an electronic key or the mobile terminal 200 can be determined by a communication path of a signal transmitted to the on-board device 100 from the device used for unlocking. For example, the device used for unlocking can be determined depending on whether or not the signal is transmitted through an electric wave in RF bands or through short-distance wireless communication.

Whether or not the mobile terminal 200 is possessed by the owner of the vehicle can be determined by referring to the terminal authentication information transmitted from the mobile terminal 200. For example, as illustrated in FIG. 5A, the on-board device 100 determines whether or not the received terminal authentication information is permanent. Here, when the received terminal authentication information is provided with a validity term, or when the terminal authentication information is a onetime key, the on-board device 100 can determine that the vehicle was unlocked with "other mobile terminals." Thus, when the terminal authentication information is temporary, the on-board device 100 may determine that the vehicle was unlocked with "other mobile terminals." In addition, as illustrated in FIG. 5B, the terminal authentication information may be transmitted together with an identifier unique to each of the mobile terminal 200, and the on-board device 100 may determine whether or not the received identifier is registered in advance.

Figure 6:
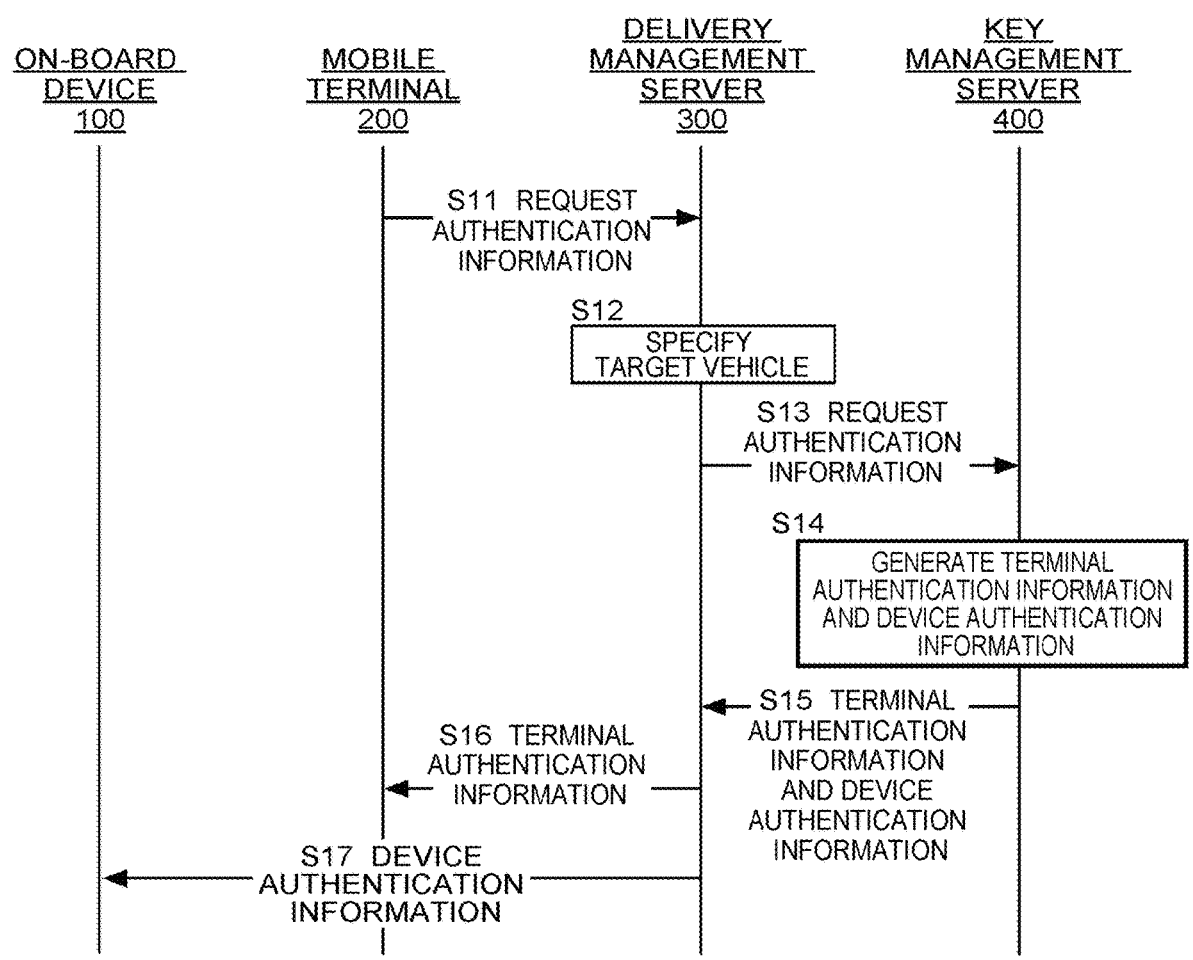
FIG. 6 is an explanatory view illustrating a data flow in the first embodiment.

A description is now given of the overall process flow performed by each of the component members. The process can be divided into a phase (first phase) in which the mobile terminal 200 acquires the terminal authentication information, and a phase (second phase) in which the mobile terminal 200 accesses the on-board device 100 with the acquired terminal authentication information, and locks and unlocks the vehicle. FIG. 6 illustrates the data flow in the first phase, and FIG. 7 illustrates the data flow in the second phase.

The first phase will be described with reference to FIG. 6. The process of steps S11 to S17 is executed when the mobile terminal 200 requests issuance of terminal authentication information. First, in step S11, the mobile terminal 200 requests the delivery management server 300 to issue terminal authentication information. In step S11, the mobile terminal 200 concurrently transmits information to identify the mobile terminal 200 and information to identify a package as an authentication information request. The information to identify a package is hereinafter referred to as package information that is, for example, a slip number.

In step S12, based on the acquired package information and prestored information, the delivery management server 300 (delivery management unit 3021) identifies the vehicle 10 as the address for delivery. Next, the delivery management server 300 adds the identifier of the vehicle 10 to the authentication information request, and transmits the authentication information request to the key management server 400 (step S13).

In step S14, the key issuing unit 4021 generates (or acquires) terminal authentication information and device authentication information unique to the mobile terminal 200 and the vehicle 10 (on-board device 100 mounted on the vehicle 10).

Next, in step S15, the key management server 400 transmits the generated terminal authentication information and device authentication information to the delivery management server 300 (step S15). The delivery management server 300 transfers the received terminal authentication information to the mobile terminal 200 (step S16) The delivery management server 300 also transfers the received device authentication information to the on-board device 100 (step S17). Accordingly, the operation to unlock the vehicle 10 on the mobile terminal 200 becomes executable. Although the terminal authentication information and the device authentication information are transferred through the delivery management server 300 in the present example, the terminal authentication information may directly be transmitted from the key management server 400 to the mobile terminal 200, and the device authentication information may directly be transmitted from the key management server 400 to the on-board device 100.

Since the process of steps S11 to S17 is a preparatory process for locking and unlocking, it is preferable to perform the process in advance. For example, the process may be executed in a preparatory step of delivery.

The second phase will be described with reference to FIG. 7. Steps S21 to S23 are the process for unlocking the vehicle 10 with the mobile terminal 200. When a user (i.e., a person in charge of delivery) of the mobile terminal 200 performs operation to unlock the vehicle 10 through the input output unit, a link between the mobile terminal 200 and the on-board device 100 is established through BLE, and in step S21, the mobile terminal 200 transmits a unlocking request and terminal authentication information to the on-board device 100.

In step S22, the authentication unit 1022 included in the on-board device 100 collates the terminal authentication information transmitted from the mobile terminal 200 and the device authentication information stored in advance to perform an authentication process. When authentication is successful, the key control unit 1023 unlocks the door 111 of the vehicle 10. In step S23, the sound output unit 1024 included in the on-board device 100 determines the type of a communication destination unit based on the stored sound definition data and the terminal authentication information transmitted from the mobile terminal 200, and outputs a corresponding sound. The sound to be output may be a loop sound. In the case of the loop sound, the sound may continuously be output while the door 111 is open or while the door 111 is unlocked.

Steps S31 to S34 are the process for locking the vehicle 10 with the mobile terminal 200. When the user of the mobile terminal 200 performs operation to lock the vehicle 10 through the input output unit, the mobile terminal 200 transmits a locking request and terminal authentication information to the on-board device 100 in step S31.

In step S32, the authentication unit 1022 included in the on-board device 100 collates the terminal authentication information transmitted from the mobile terminal 200 and the device authentication information stored in advance to perform the authentication process. When authentication is successful, the key control unit 1023 locks the door 111 of the vehicle 10.

In step S33, the sound output unit 1024 included in the on-board device 100 stops the sound if the sound is being output.

After the vehicle is locked, the communication processing unit 1021 included in the on-board device 100 transmits a notification notifying that locking is completed (locking notification) to the mobile terminal 200 (step S34). Accordingly, the notification notifying that locking is completed is output on the touch panel screen of the mobile terminal 200. When the terminal authentication information is a onetime key, the onetime key may be cancelled at the timing of step S34. Finally, the mobile terminal 200 transmits the locking notification to the delivery management server 300 (step S35).

As described before, according to the present embodiment, in the system for unlocking the vehicle 10 with the mobile terminal 200, the vehicle 10 can output different sounds between when unlocking is performed with a specified mobile terminal and when unlocking is performed with other means. Accordingly, it is possible to notify surrounding people that an authorized person is unlocking the vehicle with the sound.

In the first embodiment, it is determined whether or not the mobile terminal 200 used for unlocking the vehicle 10 is the mobile terminal possessed by the owner of the vehicle, and a sound different according to the determination result is output. In a second embodiment, the type of the mobile terminal is further subdivided, and a sound different for each of the types is output.

In the second embodiment, the sound output unit 1024 stores sound definition data as illustrated in FIG. 3B. As illustrated, the type of the mobile terminal 200 is defined into three types A to C in this example. The type of the mobile terminal may be allocated for every delivery company, for example. In the second embodiment, when the mobile terminal 200 transmits an unlocking request (and terminal authentication information) to the on-board device 100 in step S21, the mobile terminal 200 further transmits the type of its own device (for example, information indicative of a type A mobile terminal), and the on-board device 100 determines the sound to be output based on the information as illustrated in FIG. 5C.

Although the type of the mobile terminal is defined for every delivery company in this example, the type of the mobile terminal may be defined based on the information other than the information on the delivery companies. For example, the type different for each unlocking purpose may be defined.

Since the sound different for each type of the mobile terminal is output in the second embodiment, it is possible to notify information, such as information on the company that the person who unlocked the vehicle belongs to, and information on the purpose of unlocking the vehicle.

The aforementioned embodiment is merely one example, and the present disclosure may appropriately be changed without departing from the meaning thereof.

For example, "no sound" may be allocated as a sound defined in the sound definition data. In each of the embodiments, the sound is output for notifying people around the vehicle. However, the sound may be output for the user who unlocked the vehicle. For example, when the terminal authentication information used for unlocking is a onetime key, or when the terminal authentication information has a validity term, a voice announcing this information may additionally be output as a sound. For example, an announcement such as "store the package within_minutes and locks the vehicle" may be output. Thus, the sound to be output may be generated or determined based on the characteristics of the terminal authentication information transmitted from the mobile terminal 200.

Instead of storing the sound definition data illustrated in FIG. 3A or 3B in the on-board device 100 in advance, information that identifies the sound to be output may directly be added to the terminal authentication information issued by the key management server 400. For example, the information including "output synthetic speech to announce that authentication is normally completed," and "output sound 2" may be added to the terminal authentication information. In this case, in the process of step S14, the key management server 400 may generate the information in compliance with specified standards, and transmit the generated information in step S15. When the on-board device 100 authenticates the mobile terminal 200 in step S22, the on-board device 100 may generate or determine the sound to be output with reference to the information.

The information about the mobile terminal 200 may be added to the terminal authentication information itself, and the on-board device 100 may extract the information from the received terminal authentication information as illustrated in FIG. 5D.

Although the cabin and the trunk of the vehicle are described as the lockable and unlockable regions where packages can be stored in the description of embodiments, the regions are not limited thereto. The present disclosure may be applied to other than the vehicle, such as facilities and storage devices, as long as they have regions lockable and unlockable with a mobile terminal.

What is claimed is:

1. A sound output apparatus placed in a vehicle having a door that is lockable and unlockable based on a result of communication with mobile terminals, the sound output apparatus comprising:
   a sound output controller configured to:
      determine, when the door of the vehicle is unlocked based on authentication information for unlocking of the door received from a mobile terminal of the mobile terminals, which one of an owner of the vehicle and a person in charge of delivery possesses the mobile terminal;
      notify, when it is determined that the person in charge of delivery possesses the mobile terminal, an area surrounding the vehicle that the vehicle was unlocked by the person in charge of delivery including outputting a first sound from a speaker to the area surrounding the vehicle;
      output a second sound, different from the first sound, from the speaker to the area surrounding the vehicle when it is determined that the owner of the vehicle possesses the mobile terminal; and output a third sound, different from the first and second sounds, from the speaker to the area surrounding the vehicle when it is determined that another person in charge of delivery different from the person in charge of delivery possesses the mobile terminal.

2. The sound output apparatus according to claim 1, wherein the sound output controller is configured to determine that the person in charge of delivery possesses the mobile terminal when the authentication information is provided with a time length of validity.

3. The sound output apparatus according to claim 1, wherein
the sound output controller is configured to store a plurality of different types of the mobile terminal in association with corresponding different sounds to be output, and
the sound output controller is configured to output the sounds from the speaker corresponding to a type of the mobile terminal.

4. The sound output apparatus according to claim 3, wherein each of the different sounds corresponds to a different delivery company.

5. The sound output apparatus according to claim 1, wherein the sound output controller is configured to output, when the door is unlocked, a sound announcing that the door is unlocked by an authorized person.

6. The sound output apparatus according to claim 5, wherein the sound announcing that the door is unlocked by the authorized person includes synthetic speech.

7. The sound output apparatus according to claim 1, wherein the sound output controller is configured to output a loop sound that continuously sounds while the door is open.

8. A vehicle communicable with mobile terminals, the vehicle comprising:
a door;
a first communication circuit configured to receive, from a mobile terminal of the mobile terminals, authentication information for unlocking the door; and
circuitry configured to:
unlock the door based on the authentication information;
determine, when the door is unlocked, which one of an owner of the vehicle and a person in charge of delivery possesses the mobile terminal;
notify, when it is determined that the person in charge of delivery possesses the mobile terminal, an area surrounding the vehicle that the vehicle was unlocked by the person in charge of delivery including outputting a first sound from a speaker to the area surrounding the vehicle;
output a second sound, different from the first sound, from the speaker to the area surrounding the vehicle when it is determined that the owner of the vehicle possesses the mobile terminal; and
output a third sound, different from the first and second sounds, from the speaker to the area surrounding the vehicle when it is determined that another person in charge of delivery different from the person in charge of delivery possesses the mobile terminal.

9. The sound output apparatus according to claim 1, wherein the sound output controller is configured to determine that the person in charge of delivery possesses the mobile terminal when the authentication information is a onetime key.

10. The sound output apparatus according to claim 1, wherein the sound output controller is configured to determine which one of the owner of the vehicle and the person in charge of delivery possesses the mobile terminal based upon a unique identifier received with the authentication information.

11. The sound output apparatus according to claim 1, wherein the person in charge of delivery is not an owner of the vehicle.

12. A sound output control method performed by a sound output controller placed in a vehicle having a door that is lockable and unlockable based on a result of communication with mobile terminals, the sound output control method comprising:
determining, when the door of the vehicle is unlocked based on authentication information for unlocking of the door received from a mobile terminal of the mobile terminals, which one of an owner of the vehicle and a person in charge of delivery possesses the mobile terminal;
notifying, when it is determined that the person in charge of delivery possesses the mobile terminal, an area surrounding the vehicle that the vehicle was unlocked by the person in charge of delivery including outputting a first sound from a speaker to the area surrounding the vehicle;
outputting a second sound, different from the first sound, from the speaker to the area surrounding the vehicle when it is determined that the owner of the vehicle possesses the mobile terminal; and
outputting a third sound, different from the first and second sounds, from the speaker to the area surrounding the vehicle when it is determined that another person in charge of delivery different from the person in charge of delivery possesses the mobile terminal.

13. The vehicle according to claim 8, wherein
the vehicle includes a plurality of independent regions, and
the authentication information enables one of the plurality of independent regions to be locked and unlocked.

14. A locking and unlocking system comprising:
mobile terminals each including a short-distance communication interface configured to transmit first authentication information through short-distance wireless communication;
a vehicle including:
a door,
a first communication circuit configured to receive the first authentication information from a mobile terminal of the mobile terminals, the first authentication information being information for unlocking the door, and
circuitry configured to:
unlock the door based on a result of collating the first authentication information and second authentication information, the second authentication information being information corresponding to the first authentication information,
determine, when the door is unlocked, which one of an owner of the vehicle and a person in charge of delivery possesses the mobile terminal,
store the second authentication information,
notify, when it is determined that the person in charge of delivery possesses the mobile terminal, an area surrounding the vehicle that the vehicle was unlocked by the person in charge of delivery including outputting a first sound from a speaker to the area surrounding the vehicle, and output a second sound, different from the first sound, from the speaker to the area surrounding the vehicle when it is determined that the owner of the vehicle possesses the mobile terminal, and output a third sound, different from the first and second sounds, from the speaker to the area surrounding the vehicle when it is determined that another person in charge of delivery different from the person in charge of delivery possesses the mobile terminal; and a server apparatus including a second communication circuit configured to:

transmit the first authentication information to the mobile terminal, and transmit the second authentication information to the vehicle.

* * * * *